US009555902B1

(12) United States Patent
Lake et al.

(10) Patent No.: US 9,555,902 B1
(45) Date of Patent: Jan. 31, 2017

(54) FLEET PERFORMANCE OPTIMIZATION TOOL ENHANCEMENT

(75) Inventors: Peter J. Lake, Auburn, WA (US); Jay K. McCullough, Freeburg, IL (US); Steven D. Chapman, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 12/983,641

(22) Filed: Jan. 3, 2011

(51) Int. Cl.
G06F 15/00 (2006.01)
B64F 5/00 (2006.01)
G06Q 10/06 (2012.01)

(52) U.S. Cl.
CPC .......... *B64F 5/0045* (2013.01); *G06Q 10/063* (2013.01)

(58) Field of Classification Search
CPC ...................................................... G05B 23/02
See application file for complete search history.

(56) References Cited

U.S. PATENT DOCUMENTS

| 7,580,847 | B2 | 8/2009 | Black et al. |
| 2004/0039499 | A1* | 2/2004 | Felke et al. ....... G06F 17/30595 701/29.3 |
| 2007/0198222 | A1* | 8/2007 | Schuster et al. .............. 702/187 |
| 2007/0241908 | A1* | 10/2007 | Coop .......................... 340/572.8 |
| 2008/0021604 | A1 | 1/2008 | Bouvier et al. |
| 2008/0154458 | A1 | 6/2008 | Brandstetter et al. |
| 2009/0276438 | A1 | 11/2009 | Lake et al. |
| 2009/0312897 | A1* | 12/2009 | Jamrosz et al. ................ 701/29 |
| 2011/0166799 | A1* | 7/2011 | Bechhoefer ............ G01N 29/14 702/35 |

OTHER PUBLICATIONS

U.S. Appl. No. 12/620,598, filed Nov. 18, 2009.
U.S. Appl. No. 12/569,642, filed Sep. 9, 2009.
U.S. Appl. No. 12/569,545, filed Sep. 29, 2009.

* cited by examiner

*Primary Examiner* — Jermele M Hollington
*Assistant Examiner* — Haidong Zhang
(74) *Attorney, Agent, or Firm* — Armstrong Teasdale LLP

(57) ABSTRACT

Methods and systems are provided for managing a system that includes at least one component. The one component is removed from the system. If it is determined that the one component was removed from the system for a reason that is not failure of the one component, then it is indicated that the one component is potentially serviceable.

20 Claims, 4 Drawing Sheets

Component Data Filter

Fleet: [▼]    Text Filter: [    ]    Data View: [Operator ▼]

● Component ID  ○ Description

Components

| Component ID ▲ | Component ID | TCA | NFF | SI | RMV | CX | FEX | DLY |
|---|---|---|---|---|---|---|---|---|
| 2131144031 | CNTRL AUTO PRSZN (ANLOG/DIGTL) [EQUIP NO: M00325/M... | 86% | N/A | 6 | 91 | 0 | 0 | 6 |
| 2131368051 | PANEL PRSZN CONT [EQUIP NO: P005-06/P00506]... | 90% | 20% | 6 | 131 | 0 | 0 | 6 |
| 2131420401 | RELAY PRSZN OUTFL VALVE CLOSD [EQUIP NO: M00324-K1... | N/A | N/A | 0 | 1 | 0 | 0 | 0 |
| 2131420692 | RELAY ACOND PRSZN CONT LCD LGHTN CONT [EQUIP NO: R... | N/A | N/A | 0 | 1 | 0 | 0 | 0 |
| 2131576012 | VALVE PRES CONT HEAT CONT FWD OUTFL [EQUIP NO: V00... | N/A | N/A | 0 | 9 | 0 | 0 | 0 |
| 2131576341 | VALVE ACOND PRES CONT OUTFL [EQUIP NO: V00048] | 93% | N/A | 0 | 59 | 0 | 0 | 0 |
| 2131576382 | VALVE PRSZN RELEF (BLOUT/SAFTY/POSIV) | 67% | 67% | 0 | 3 | 0 | 0 | 0 |
| 2131284011 | INDR CABIN PRES ROC [EQUIP NO: N00055] | 67% | N/A | 1 | 9 | 0 | 0 | 1 |
| 2131284051 | INDR ALTM AND DFNTL PRES (DPI) [EQUIP NO: N00051] | N/A | N/A | 0 | 8 | 0 | 0 | 0 |
| 2131522041 | SW CABIN PRES (ALT) WARNG [EQUIP NO: S00128/S01172... | N/A | N/A | 0 | 6 | 0 | 0 | 0 |

Component Count: 10

Export Data

FIG. 4

Selected Component Data
Aircraft Removal and Event Counts
Removals: 5  Schedule Interruptions: 3  Cancellations: 0  Flight Exceptions: 0  Delays: 3

View in Component Browser

| Date | Event | Rmv Cd | | |
|---|---|---|---|---|
| 9/26/2007 | | U | Complaint Text: | CTC BORROWED FROM ABC AIRLINE FOR OUTBOUND FLIGHT #178 |
| | | | Action Text: | INSTALLED NEW CTC PER MM. OP CHECK GOOD. |
| 9/26/2007 | | U | Complaint Text: | AFTER PUSHBACK LEFT PACK ILLUMINATED ON MASTER RECALL SIMILAR OCCURRENCE IN WRITE UP )'35 ON 9/21, HOWEVER NO ZONE TEMP LTS THIS TIME. |
| | | | Action Text: | PREFORMED BITE ON LEFT AND RIGHT ZONE TEMP CONTROLS CLEARED FAULT. CHANGED CTC AS PRECAUTIONARY OK FOR SERVICE. |
| 1/12/2009 | | S | Complaint Text: | ON RECALL-LT PACK LIGHT AND CONT CAB ZONE LT ILLUMINATED. COUND NOT CONTROL TEMP FROM CONT CAB TEMP CONTROLLER REPEAT PIREP NO. 12, 25. |
| | | | Action Text: | PLACARDED CONT CAB ZONE TRIM VLV INOP. PER MELENTERED IN MIC AUTH. 1-242-C. |

FLEET PERFORMANCE OPTIMIZATION TOOL ENHANCEMENT

A portion of the disclosure of this patent document contains material which is subject to copyright protection. The copyright owner has no objection to the reproduction of the patent document as it appears in the U.S. Patent and Trademark Office patent file or records, but otherwise reserves all copyrights.

BACKGROUND

The subject matter described herein relates generally to quality control and, more particularly, to methods and systems for use in identifying a potentially serviceable component that may be used to manage the performance of a system.

Known aircraft generally include a plurality of components that may be removed from the aircraft for a variety of reasons including, without limitation, component scarcity, component maintenance, and/or component failure. For example, at least some known aircraft components may be interchanged between aircraft, routinely inspected, refurbished, and/or even discarded. Cycling such components through assembly, operation, disassembly, and/or repair may facilitate increasing aircraft availability and/or improving overall system performance of the aircraft.

During cycling and during operation, health management data is gathered from at least some known components. However, transforming actionable information for at least some known aircraft from health management data may be a time-consuming and/or tedious task depending on the quantity of components monitored and/or the amount of health management data gathered. To reduce some of the health management requirements, at least some observed issues have been historically addressed using anecdotal methods. For example, one known health management system includes an ad-hoc investigation of observed issues.

BRIEF DESCRIPTION

In one aspect, a method is provided for managing a system that includes at least one component. The method includes identifying a removal of the one component from the system. If it is determined that the one component was removed from the system for a reason that is not failure of the one component, then it is indicated that the one component is potentially serviceable.

In another aspect, a server is provided for managing a system that includes at least one component. The server includes a memory device and a processor coupled to the memory device. The server is programmed to identify a removal of the one component from the system. If it is determined that the one component was removed from the system for a reason that is not failure of the one component, then it is indicated that the one component is potentially serviceable.

In yet another aspect, a system is provided for managing a system that includes at least one component. The system includes a scanning device and a server that is coupled to the scanning device. The scanning device is configured to scan the one component for health management data. The server includes a memory device and a processor coupled to the memory device. The server is programmed to receive, from the scanning device, health management data associated with the one component. If the server identifies that the one component was removed from the system for a reason that is not failure of the one component, then the server indicates that the one component is potentially serviceable.

The features, functions, and advantages discussed herein can be achieved independently in various embodiments of the present invention or may be combined in yet other embodiments further details of which can be seen with reference to the following description and drawings.

BRIEF DESCRIPTION OF THE DRAWINGS

FIGS. 4 and 5 are exemplary screenshots that may be presented to a user using the system shown in FIG. 2.

DETAILED DESCRIPTION

The subject matter described herein relates generally to quality control and, more particularly, to methods and systems for use in identifying a potentially serviceable component to facilitate managing and/or enhancing the performance of a system that includes a plurality of components. In one embodiment, a component is removed form a system, and a server receives health management data associated with the component. Based at least in part on the health management data, it may be determined that the component was not removed from the system for a failure or, more particularly, that the component was removed from the system for a reason other than failure. If such a determination is made, then the component is identified to be potentially serviceable. Accordingly, health management data may be transformed into actionable information, thereby enabling the system to reduce the quantity of unused components stored locally.

An exemplary technical effect of the methods and systems described herein includes at least one of: (a) receiving health management data associated with one component of a system; (b) examining the health management data for an indicator associated with a removal of the one component from the system; (c) identifying the removal of the one component from the system; (d) examining the health management data for an indicator associated with a reason for the removal of the one component; (e) determining that the one component was removed from the system for a reason that is not failure of the one component; (f) indicating that the one component is potentially serviceable; (g) generating an alert that is indicative of the one component being potentially serviceable; (h) determining an availability of the one component; and (i) generating an action step for the one component.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
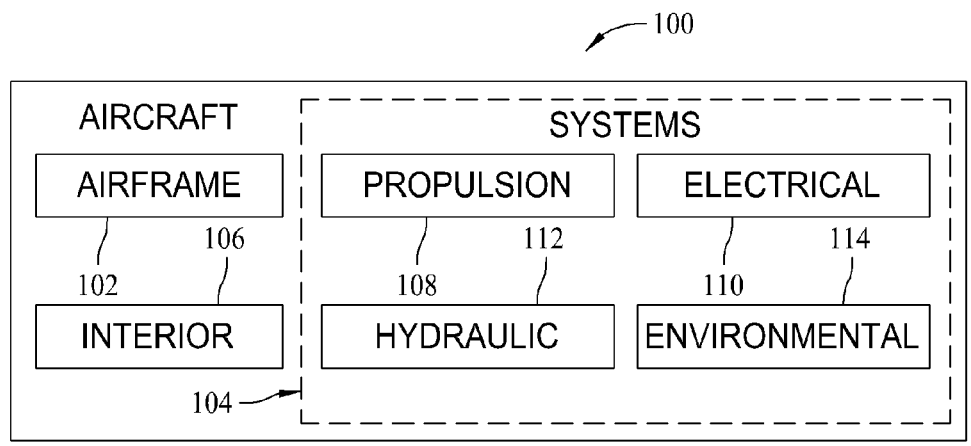
FIG. 1 is a schematic illustration of an exemplary aircraft including a plurality of components.

Referring to the figures, exemplary embodiments of the disclosure are described in the context of an exemplary aircraft 100 shown in FIG. 1. In the exemplary embodiment, aircraft 100 includes an airframe 102 and an interior 106.

Moreover, in the exemplary embodiment, aircraft 100 also includes a plurality of operational systems 104 that each includes at least one component (not shown). For example, in the exemplary embodiment, systems 104 include a propulsion system 108, an electrical system 110, a hydraulic system 112, and/or an environmental system 114. Any number of other systems may be included without deviating from the present invention. For example, although only an aerospace system is shown, the present invention may be used within other industries such as, but not limited to, the automotive industry.

Figure 2:
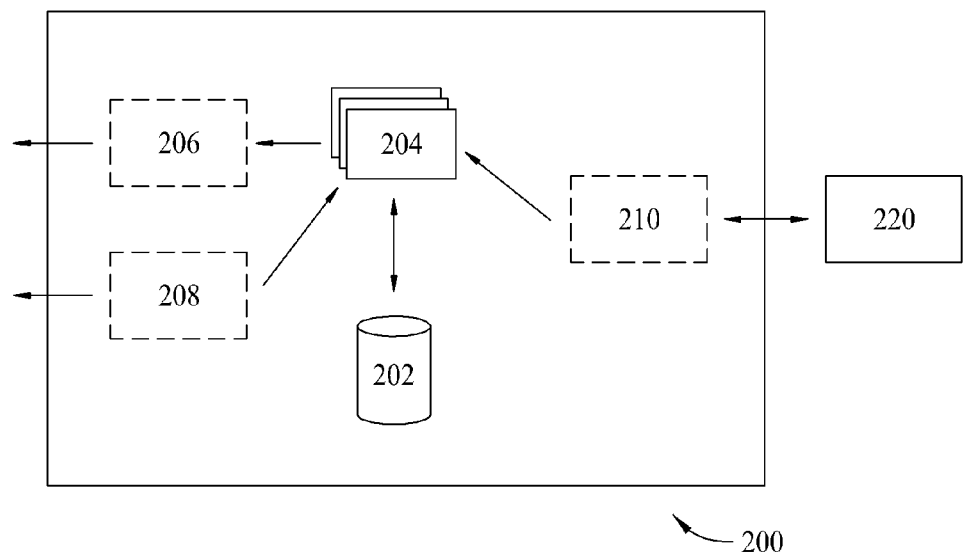
FIG. 2 is a schematic illustration of an exemplary monitoring system that may be used to identify a rogue component used with the aircraft shown in FIG. 1.

FIG. 2 illustrates an exemplary server and/or computing system 200 that may be used to identify a potentially serviceable component (not shown) that may facilitate improving a performance of aircraft 100 or, more specifically, of at least one system 104 (shown in FIG. 1). As used herein, the term "potentially serviceable component" refers to any component that could potentially be used with aircraft 100 at that particular time without any additional maintenance and/or repair.

In the exemplary embodiment, computing system 200 includes a memory device 202 and a processor 204 coupled to memory device 202 for executing instructions. In the exemplary embodiment, computing system 200 is configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits.

In the exemplary embodiment, memory device 202 includes one or more devices (not shown) that enable information such as executable instructions and/or other data to be selectively stored and retrieved. In the exemplary embodiment, such data may include, but is not limited to, health management data such as flight statistics, mechanic log books, repair order data, replacement order data, maintenance order data, serialized part numbers, and/or service dates. Memory device 202 may also include one or more computer readable media, such as, without limitation, dynamic random access memory (DRAM), static random access memory (SRAM), a solid state disk, and/or a hard disk.

In the exemplary embodiment, computing system 200 includes a presentation interface 206 that is coupled to processor 204 for use in presenting information to a user. For example, presentation interface 206 may include a display adapter (not shown) that may couple to a display device (not shown), such as, without limitation, a cathode ray tube (CRT), a liquid crystal display (LCD), a light-emitting diode (LED) display, an organic LED (OLED) display, and/or an "electronic ink" display. In some embodiments, presentation interface 206 includes one or more display devices. Additionally or alternatively, presentation interface 206 may be coupled to, and/or include, a printer.

Computing system 200, in the exemplary embodiment, includes an input interface 208 for receiving input from the user. For example, in the exemplary embodiment, input interface 208 receives information suitable for use with the methods described herein. Input interface 208 is coupled to processor 204 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 206 and as input interface 208.

In the exemplary embodiment, computing system 200 includes a communication interface 210 that is coupled to processor 204. In the exemplary embodiment, communication interface 210 communicates with a remote device (not shown). For example, communication interface 210 may use, without limitation, a wired network adapter, a wireless network adapter, and/or a mobile telecommunications adapter. Additionally or alternatively, computing system 200 may be coupled to the remote device via a network (not shown). Such a network may include, without limitation, the Internet, a local area network (LAN), a wide area network (WAN), a wireless LAN (WLAN), a mesh network, and/or a virtual private network (VPN) or other suitable communication means.

In the exemplary embodiment, computing system 200 is coupled to a scanning device 220 via communication interface 210. Scanning device 220 is configured to scan at least one component for an identifier (not shown) and/or health management data. Exemplary identifiers may include, but are not limited to, a barcode, a magnetic stripe, a microchip, a radiofrequency identification tag, and a digitized photo.

Figure 3:
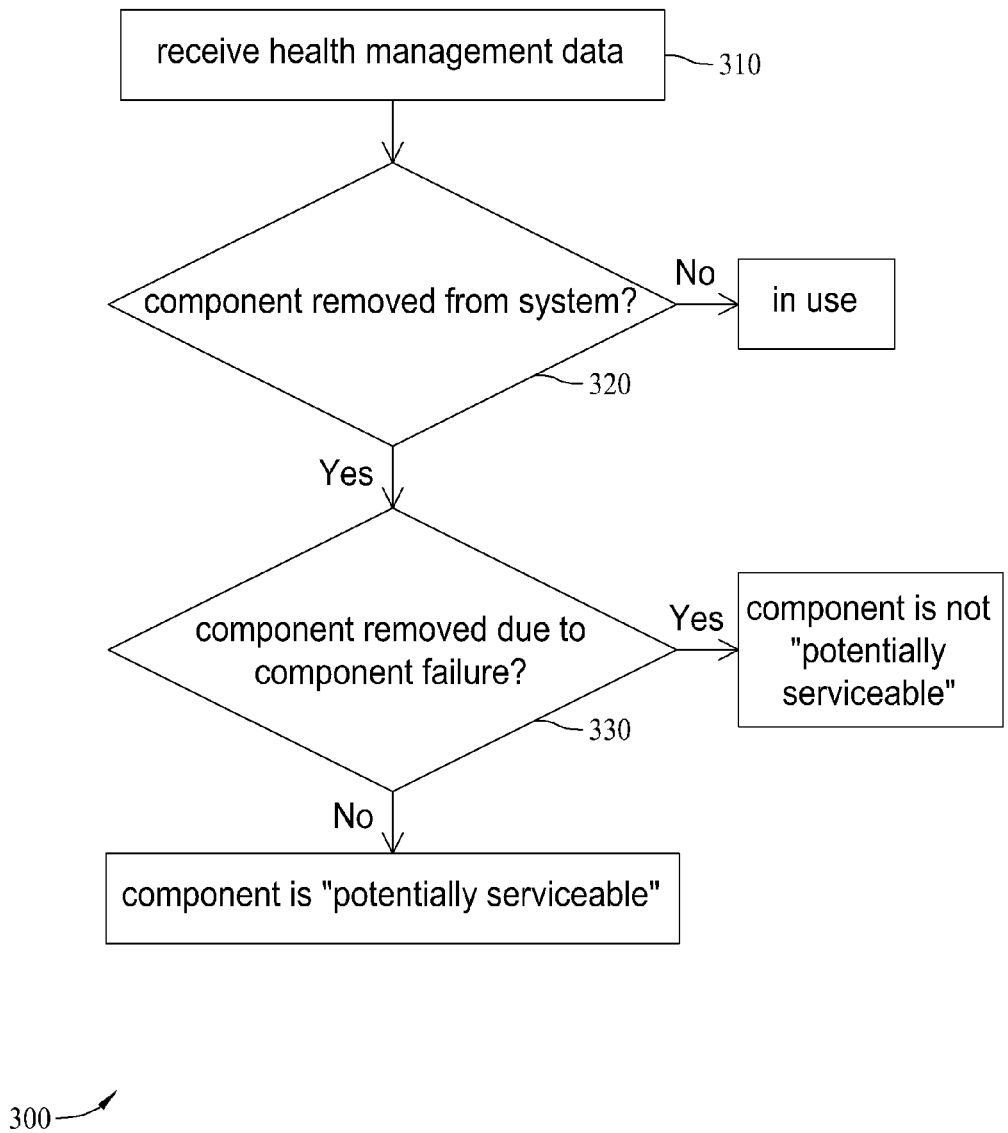
FIG. 3 is a flow chart illustrating an exemplary method for use in identifying a potentially serviceable component using the system shown in FIG. 2.

FIG. 3 illustrates an exemplary method 300 for use in identifying a potentially serviceable component (not shown) to facilitate enhancing performance of systems 104 or, more generally, aircraft 100 (shown in FIG. 1). During use, computing system 200 presents complex, voluminous health management data in an easy-to-understand format that includes actionable information. More specifically, computing system 200 alerts a user when a potentially serviceable component that is not in use at that particular time exists. As used herein, "actionable information" refers to any information that enables a user to address an issue.

Initially, health management data for at least one component is received 310 by memory device 202 or, more generally, computing system 200 (shown in FIG. 2). In the exemplary embodiment, such data may include, but is not limited to, flight statistics, mechanic log books, repair order data, replacement order data, maintenance order data, serialized part numbers, and/or service dates associated with aircraft 100 and/or its components. In one embodiment, scanning device 220 scans at least one component for health management data associated with at least the one component. More specifically, in such an embodiment, scanning device 220 scans an identifier (not shown), such as a serialized part number, that uniquely identifies a component and is associated with only that component, and data representative of the identifier is transmitted to computing system 200. A component may be scanned at various stages of an operating cycle of the component such as, without limitation, assembly, operation, disassembly, and/or repair. As such, computing system 200 enables a history of health management data to be accumulated for each component.

Based at least in part on the health management data accumulated and/or stored in memory device 202, computing system 200 determines 320 whether at least one component was removed from aircraft 100. In the exemplary embodiment, the health management data is examined to determine if a predetermined indicator (not shown in FIG. 3) exists within the accumulated data that is associated with a removal of the component. Such an indicator may be a keyword, such as the term "REMOVAL", and/or any abbreviation, acronym, industry jargon, synonym of the keyword, conjugation of the keyword, and/or code associated with the keyword. Typically, if a component is currently in use, then computing system 200 will determine that the component was not removed. In contrast, if a component is not currently in use, then computing system 200 will determine that the component was removed.

Moreover, for at least some of the components determined to be removed from aircraft 100, computing system 200 will also determine 330 whether the component was removed due to a component failure. More specifically, in the exemplary embodiment, the health management data is examined to determine if a predetermined indicator (not shown in FIG. 3) associated with a reason for the removal of the component exists within the health management data. Such an indicator may be a keyword, such as the terms "DEFECTIVE", "MAINTENANCE", "BORROWED" or "PRECAUTIONARY", and/or any abbreviation, acronym, industry jargon, synonym of the keyword, conjugation of the keyword, and/or code associated with the keyword. Typically, if the component was removed due to a routine maintenance and/or for use with another aircraft 100 and/or system, computing system 200 will determine that the component was removed due to a reason that is not component failure; if the component was removed because the component was underperforming and/or malfunctioning, then it is determined that the component was removed due to component failure. Additionally, computing system 200 may positively determine, based at least in part on the health management data, a reason for the removal of the component such as, without limitation, routine maintenance, and/or determine that the component was being used with another aircraft 100. In one embodiment, computing system 200 generates an alert when a component is determined to be potentially serviceable. Additionally and/or alternatively, computing system 200 may generate a maintenance action for the potentially serviceable component.

FIGS. 4 and 5 illustrate exemplary screenshots that may be presented to a user on presentation interface 206. More specifically, in the exemplary embodiment, health management data for a plurality of components are displayed on presentation interface 206. As shown in FIG. 4, presentation interface 206 displays health management data for a plurality of components 402. More specifically, in the exemplary embodiment, for components 402 that were removed for a reason other than component failure, presentation interface 206 displays an icon 404 that is indicative of component 402 being potentially serviceable. Icon 404 enables a user to readily identify and to focus on potentially serviceable components 402.

In the exemplary embodiment, the user may select, using input interface 208, a component 402 to receive additional health management data associated with the selected component 402. As shown in FIG. 5, presentation interface displays a plurality of entries 502 that are a time stamp indicative of each time the selected component 402 was scanned for health management data. In at least some embodiments, each entry 502 includes at least a first section 504 and a second section 506. In embodiments wherein the health management data includes sections 504 and 506, computing system 200 uses section-specific logic to determine 320 whether at least one component was removed from aircraft 100 and/or determine 330 whether the component was removed due to a component failure.

For example, in the exemplary embodiment, first section 504 includes "complaint text," which describes an observed anomaly and/or a request to perform a maintenance action, and second section 506 includes "action text," which describes an action taken to address the complaint. In the exemplary embodiment, complaint text section 504 is examined for any of a first plurality of predetermined indicators, and action text section 506 is examined for any of a second plurality of predetermined indicators. In the exemplary embodiment, the indicators are highlighted 508 and/or otherwise distinguished from the health management data presented on presentation interface 206. For example, in the exemplary embodiment, any indicator of a potentially serviceable component is displayed in bold, red letters.

Components may be removed from a system for a variety of reasons. The embodiments described herein facilitate automatically identifying a potentially serviceable component to enable a speed, accuracy, and/or productivity of engineering analysis to be increased. Moreover, the embodiments described herein enable a user to be notified that a component removal may not have been due to an anomaly, thus enabling an idle time of a component, i.e., a quantity of time that the component is not used, to be reduced. For example, not all components are removed from a system because they are in need of repair and/or are otherwise not serviceable. Rather, at least some components are removed for use with another system and/or for routine inspection. The embodiments described herein facilitate identifying why and/or why not the component was removed from the system. Accordingly, the exemplary methods and systems enable health management data to be transformed into actionable information.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of managing a system that includes a plurality of components, wherein the method is implemented using a computer coupled to a memory, said method comprising:

storing health management data for the plurality of components, wherein the health management data includes one or more text sections;

selecting an identifier associated with one of the plurality of components;

accessing the health management data of the one component based on the selected identifier;

parsing the one or more text sections of the health management data to determine whether a first predetermined indicator is included in the health management data, by searching the health management data for at least one predefined keyword and at least one of a synonym and a conjugation of the predefined keyword;

identifying a removal of the one component from the system based on the at least one predefined keyword;

automatically determining whether the one component was removed from the system for a reason that is not failure of the one component and that the one component is potentially serviceable based on a meaning of the first predetermined indicator, wherein the potentially serviceable component could potentially be used in the system without additional maintenance or repair; and if the determination was that the one component was removed from the system for a reason that is not a failure and is potentially serviceable, indicating that the one component is potentially serviceable, including visually highlighting the first predetermined indicator in the health management data.

2. A method in accordance with claim 1, wherein identifying a removal of the one component from the system further comprises:

receiving the health management data associated with the one component; and examining the health management data for a second predetermined indicator that is associated with the removal of the one component.

3. A method in accordance with claim 1, wherein automatically determining that the one component was removed from the system for a reason that is not failure of the one component further comprises:

receiving the health management data associated with the one component; and examining the health management data for the first predetermined indicator, wherein the first predetermined indicator is associated with a reason for the removal of the one component.

4. A method in accordance with claim 1, wherein at least one of identifying a removal of the one component from the system and automatically determining that the one component was removed from the system for a reason that is not failure of the one component further comprises:

receiving the health management data associated with the one component, the health management data including a first field and a second field;

examining the first section of the health management data for the first predetermined indicator; and examining the second section of the health management data for a second predetermined indicator.

5. A method in accordance with claim 1, wherein indicating that the one component is potentially serviceable further comprises generating an alert that is indicative of the one component being potentially serviceable.

6. A method in accordance with claim 1 further comprising determining an availability of the one component.

7. A method in accordance with claim 1 further comprising generating an action step for the one component.

8. A method in accordance with claim 1 wherein a potentially serviceable component is a component that does not need maintenance or repair prior to being used again.

9. A method in accordance with claim 1 wherein the selected identifier is only associated with the component.

10. A server for managing a system that includes a plurality of components, said server comprising a memory device and a processor coupled to the memory device, said server programmed to:

store health management data for the plurality of components, wherein the health management data includes one or more text sections;

select an identifier associated with one of the plurality of components;

access the health management data of the one component based on the selected identifier;

parse the one or more text sections of health management data to determine whether a first predetermined indicator is included in the health management data, by searching the health management data for at least one predefined keyword and at least one of a synonym and a conjugation of the predefined keyword;

identify a removal of the one component from the system based on the at least one predefined keyword;

automatically determine whether the one component was removed from the system for a reason that is not failure of the one component and that the one component is potentially serviceable based on a meaning of the first predetermined indicator, wherein the potentially serviceable component could potentially be used in the system without additional maintenance or repair; and if the determination was that the one component was removed from the system for a reason that is not a failure and is potentially serviceable, indicate that the one component is potentially serviceable, including visually highlighting the first predetermined indicator in the health management data.

11. A server in accordance with claim 10, wherein said server is further configured to:

receive the health management data associated with the one component; and examine the health management data for a second predetermined indicator that is associated with the removal of the one component.

12. A server in accordance with claim 10, wherein said server is further configured to:

receive the health management data associated with the one component; and examine the health management data for the first predetermined indicator, wherein the first predetermined indicator is associated with a reason for the removal of the one component.

13. A server in accordance with claim 10, wherein said server is further configured to:

receive the health management data associated with the one component, the health management data including a first field and a second field;

examine the first section of the health management data for the first predetermined indicator; and examine the second section of the health management data for a second predetermined indicator.

14. A server in accordance with claim 10, wherein said server is further configured to generate an alert that is indicative of the one component being potentially serviceable.

15. A server in accordance with claim 10, wherein said server is further configured to determine an availability of the one component.

16. A server in accordance with claim 10, wherein said server is further configured to generate an action step for the one component.

17. A system for managing a system that includes a plurality of components, said system comprising:

a scanning device that is configured to scan an identifier of each of the plurality of components; and a server coupled to said scanning device, said server comprising a memory device and a processor coupled to the memory device, said server programmed to:

receive, from said scanning device, the health management data associated with one of the plurality of components based on the scanned identifier associated with the one component, wherein the health management data includes one or more text sections;

parse the one or more text sections of the health management data to determine whether a first predetermined indicator is included in the health management data, by searching the health management data for at least one predefined keyword and at least one of a synonym and a conjugation of the predefined keyword;

identify a removal of the one component from the system based on the at least one predefined keyword;

automatically determine whether the one component was removed from the system for a reason that is not failure of the one component and that the one component is potentially serviceable based on a meaning of the first predetermined indicator, wherein the potentially serviceable component could potentially be used in the system without additional maintenance or repair; and if the determination was that the one component was removed from the system for a reason that is not a failure and is potentially serviceable, indicate that the one component is potentially serviceable, including visually highlighting the first predetermined indicator in the health management data.

18. A system in accordance with claim 17, wherein said server is further configured to examine the health management data for a second predetermined indicator that is associated with the removal of the one component.

19. A system in accordance with claim 17, wherein said server is further configured to examine the health management data for the first predetermined indicator, wherein the first predetermined indicator is associated with a reason for the removal of the one component.

20. A system in accordance with claim 17, wherein said server is further configured to:

examine a first section of the health management data for the first predetermined indicator; and examine a second section of the health management data for a second predetermined indicator.

* * * * *